United States Patent
Aoki et al.

[11] Patent Number: 5,857,755
[45] Date of Patent: Jan. 12, 1999

[54] COMBINED HYDRAULIC AND REGENERATIVE BRAKE SYSTEM IN AN ELECTRIC VEHICLE

[76] Inventors: Yasushi Aoki; Ikuo Nonaga; Yasushi Suganuma, all of 4-1, Chuo 1-chome, Wako-shi, Japan

[21] Appl. No.: 950,467

[22] Filed: Oct. 15, 1997

Related U.S. Application Data

[63] Continuation of Ser. No. 406,329, Mar. 17, 1995, abandoned.

[30] Foreign Application Priority Data

Mar. 17, 1994 [JP] Japan ................................. 6-046666

[51] Int. Cl.[6] ..................... B60L 7/24; B60T 8/26
[52] U.S. Cl. ................. 303/152; 180/65.1; 303/3
[58] Field of Search ..................... 303/3, 15, 152; 180/85.1–85.4, 165, 65.8

[56] References Cited

U.S. PATENT DOCUMENTS

| | | | |
|---|---|---|---|
| 4,270,806 | 6/1981 | Venkaperumal et al. | 303/3 |
| 5,433,512 | 7/1995 | Aoki et al. | 303/152 |
| 5,542,754 | 8/1996 | Aoki et al. | 303/152 |

FOREIGN PATENT DOCUMENTS 5161212  6/1993  Japan ................................. 303/152

Primary Examiner—Matthew C. Graham
Attorney, Agent, or Firm—Lyon & Lyon LLP

[57] ABSTRACT

In an electric vehicle the driven wheels connected to an electric motor are liquid-pressure braked in a condition in which a differential pressure regulating valve interposed between the driven wheels and a master cylinder has been opened, and the driven wheels are regeneratively braked in a condition in which the differential pressure regulating valve has been closed to inhibit the liquid pressure braking. By temporarily opening the differential pressure regulating valve at the start of depression of the brake pedal, a stroke of the brake pedal depending upon the play of the brake caliper is previously absorbed. Thus, when the differential pressure regulating valve has been opened to switch over the regenerative braking to the liquid pressure braking, the change in stroke of the brake pedal can be reduced by a stroke amount that corresponds to the play of the brake caliper. Therefore, it is possible to prevent the stroke of the brake pedal from being largely changed upon switching-over of from regenerative braking to a liquid pressure braking, thereby improving the braking feeling.

4 Claims, 12 Drawing Sheets

COMBINED HYDRAULIC AND REGENERATIVE BRAKE SYSTEM IN AN ELECTRIC VEHICLE

This application is a Continuation Application of application Ser. No. 08/406,329 filed on Mar. 17, 1995 now abandoned.

BACKGROUND OF THE INVENTION

1. Field of the Invention

The present invention relates to an electric vehicle including driven wheels which are connected to and driven by an electric motor using a battery as an energy source and which driven wheels are capable of being liquid-pressure braked and regeneratively braked.

2. Description of the Prior Art

Such an electric vehicle described in Japanese Patent Application Laid-Open No. 28933/74 is conventionally known. With that electric vehicle, the recovery of energy by a regenerative braking by the electric motor can be preferentially performed to possibly charge the battery, and after the magnitude of the regenerative braking force has reached a limit, a liquid pressure braking can be additionally used, thereby insuring a sufficient braking force.

The regenerative braking force generateable by the electric motor is varied depending upon the number of revolutions of the motor and, in a lower rotational range, it is difficult to generate the regenerative braking force. When the battery is in a fully charged state, it may be necessary in some cases not to conduct the regenerative braking in order to prevent damage to the battery due to over-charging. Therefore, if the regenerative braking is impossible, as described above, when the driven wheels are being regeneratively braked under a condition in which a liquid pressure circuit connecting the master cylinder and a brake caliper has been cut off to inhibit the liquid pressure braking, it is necessary to open the liquid pressure circuit to switch over the regenerative braking to the liquid pressure braking.

When the liquid pressure circuit has been opened to switch over the regenerative braking to the liquid pressure braking, the liquid pressure hitherto cut off is suddenly transferred from the master cylinder to the brake caliper. As a result, the stroke of the brake pedal is changed at that moment by a distance corresponding to the amount of liquid consumed in the brake caliper. Such a large variation in brake pedal stroke results in a problem of a degraded braking feeling.

SUMMARY OF THE INVENTION

The present invention has been accomplished with the above circumstance in view, and it is an object of the present invention to inhibit the change in the stroke of the brake pedal in switching over the regenerative braking to the liquid pressure braking thereby to improve the braking feeling.

To achieve the above object, according to the present invention, there is provided a brake system in an electric vehicle including driven wheels which are connected to and driven by na electric motor using a battery as an energy source and which driven wheels are capable of being liquid-pressure braked and regeneratively braked, comprising; a liquid pressure braking means for liquid pressure braking the driven wheels in response to the operation of a brake pedal connected to a master cylinder for supplying the liquid pressure; a regenerative braking means for regenerative braking the driven wheels in response to the operation of the brake pedal; a liquid pressure control means for limiting the braking liquid pressure transferred from the master cylinder to the liquid pressure braking means during a regenerative braking; a brake pedal operation-amount detecting means for detecting an amount of operation of the brake pedal; and a braking control means which starts limiting the braking liquid pressure by the liquid pressure control means when it is detected, based on an output from the brake pedal operation-amount detecting means, that the amount of operation of the brake pedal exceeds a predetermined value.

With the above arrangement, a large stroke produced due to the play of the brake caliper at the initial stage of the operation of the brake pedal can be previously absorbed, and in a condition in which the stroke of the brake pedal has been decreased, the regenerative braking can be started. Thus, it is possible to reduce the change in stroke of the brake pedal caused upon switching-over of the regenerative braking to the liquid pressure braking by a stroke amount depending upon the play of the brake caliper at the initial stage of the operation of the brake pedal, thereby improving the braking feeling.

DESCRIPTION OF THE PREFERRED EMBODIMENT

The present invention will now be described by way of a preferred embodiment in connection with the accompanying drawings.

Figure 1:
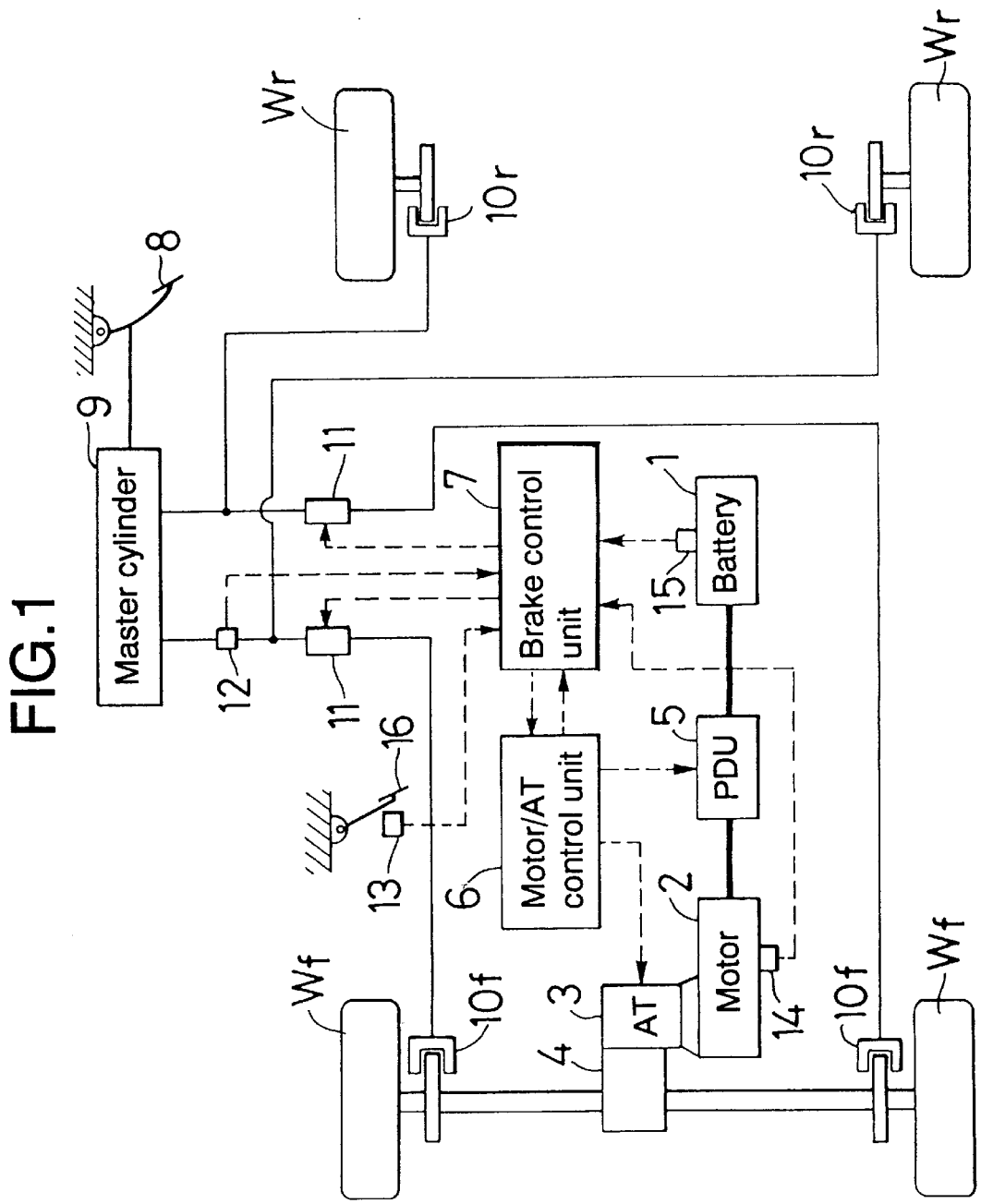
FIG. 1 is a diagrammatic illustration of the entire drive and braking arrangement of an electric vehicle of this invention.

FIGS. 1 to 12 show a first embodiment of the present invention. Referring to FIG. 1, there is shown an electric vehicle which is a four-wheel vehicle including a pair of front wheels Wf as driven wheels and a pair of rear wheels Wr as follower wheels. The front wheels Wf are connected through an automatic transmission (AT) 3 and a differential 4 to an electric motor 2 using a battery 1 as an energy source. A power drive unit (PDU) 5 is interposed between the battery 1 and the motor 2 to control the driving of the motor 2 by the battery 1 and to control the charging of the battery 1 by an electric power generated by the motor 2 during regenerative braking. The power drive unit 5 and the automatic transmission 3 are connected to a motor/AT control unit 6 which is connected to a brake control unit 7.

A master cylinder 9 operated by a brake pedal 8 is connected to brake calipers 10f, 10f for the front wheels Wf and brake calipers 10r, 10r for the rear wheels Wr. Differential pressure regulating valves 11, 11 for regulating a master cylinder liquid pressure (an input liquid pressure) $P_{IN}$ from the master cylinder 9 to transmit a predetermined caliper liquid pressure (an output liquid pressure) $P_{OUT}$ to the brake calipers 10f, 10f for the front wheels Wf are incorporated in a liquid pressure circuit connecting the master cylinder 9 and the brake calipers 10f, 10f for the front wheels Wf.

Figure 2:
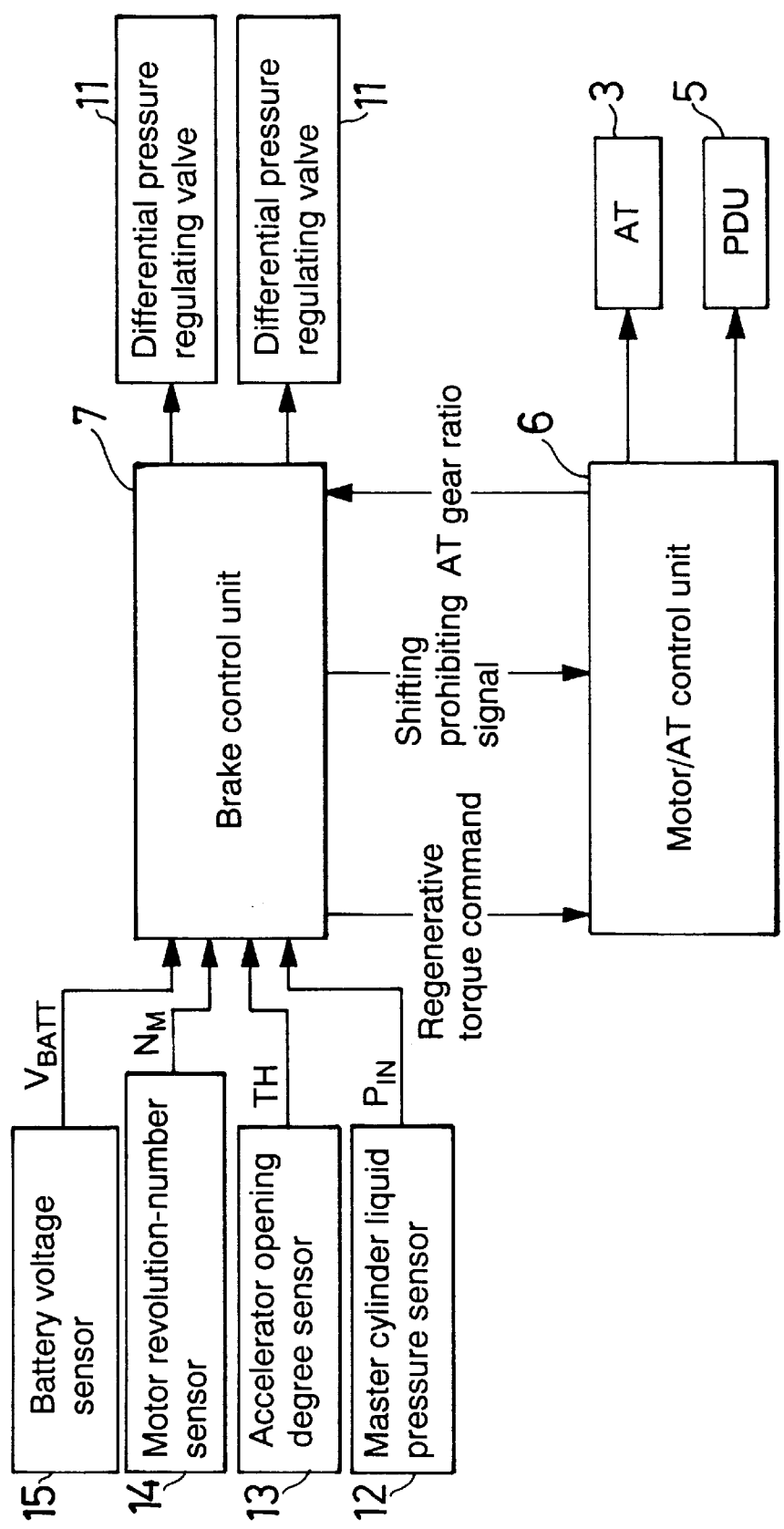
FIG. 2 is a block diagram of a control system of this invention.

As can be seen from FIG. 1 in combination with FIG. 2, connected to the brake control unit 7 are a master cylinder liquid pressure sensor 12 provided in the liquid pressure circuit connected to the master cylinder 9 for detecting a master cylinder liquid pressure $P_{IN}$, an accelerator opening degree sensor 13 provided on an accelerator pedal 16 for detecting an opening degree TH of the accelerator pedal 16, a motor revolution-number sensor 14 provided on the motor 2 for detecting a number $N_M$ of revolutions of the motor, and a battery voltage sensor 15 provided on the battery 1 for detecting a battery voltage $V_{BATT}$. The brake control unit 7 controls the differential pressure regulating valves 11, 11 based on the master cylinder liquid pressure $P_{IN}$, the accelerator opening degree TH, the number $N_M$ of revolutions of the motor, the battery voltage $V_{BATT}$ and a gear ratio of the automatic transmission 3 received from the motor/AT control unit 6.

The motor/AT control unit 6 controls the automatic transmission 3 and the power drive unit 5 based on a regenerative torque command and a shift prohibiting signal received from the brake control unit 7.

Figure 3:
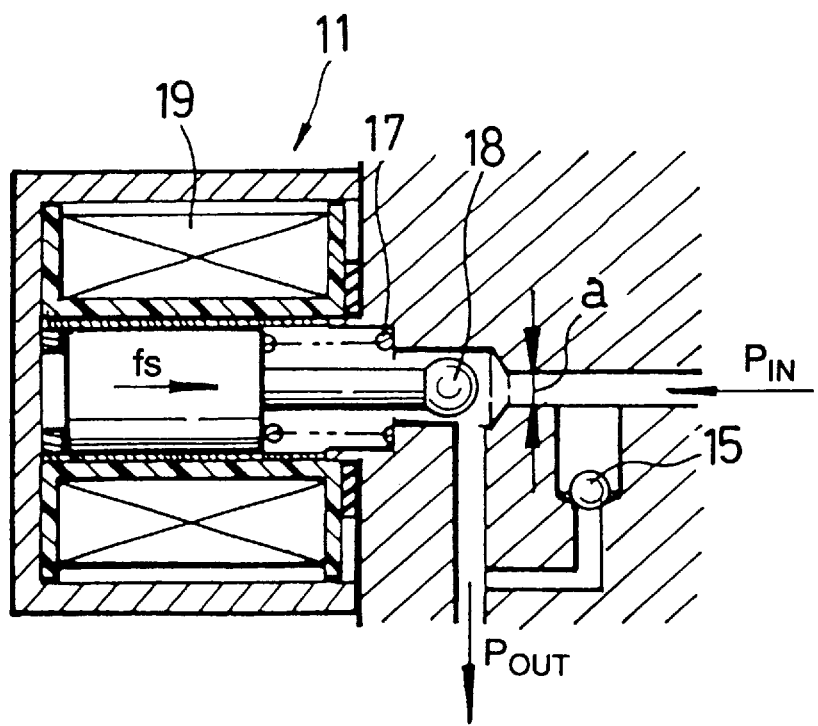
FIG. 3 is a view of the structure of a differential pressure regulating valve.

As shown in FIG. 3, the differential pressure regulating valve 11 includes a valve member 18 biased in a valve-opening direction by a spring 17, a linear solenoid 19 for adjusting a preset load of the spring 17 and a one-way valve 15 for limiting the transfer of a liquid pressure from the master cylinder 9 toward the brake cylinder 10f.

Figure 4A:
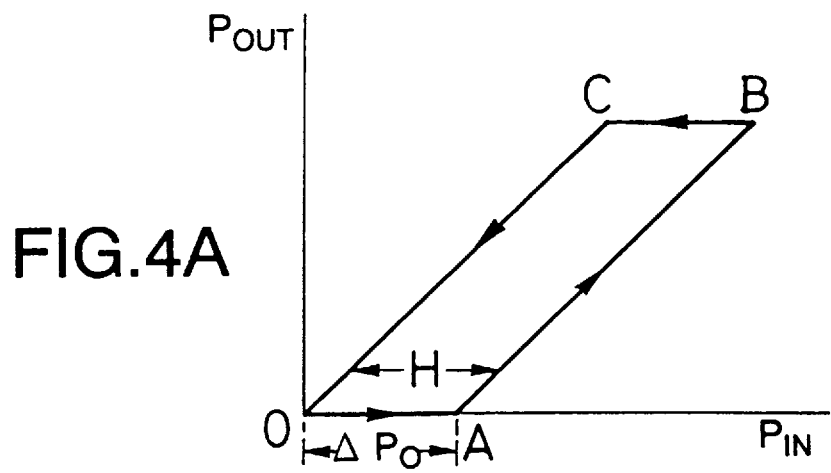
FIGS. 4A, 4B and 4C are related graphs illustrating a characteristic of the differential pressure regulating valve and a characteristic of regenerative braking force.

By the differential pressure regulating valve 11, the master cylinder liquid pressure (the input liquid pressure) $P_{IN}$ and the caliper liquid pressure (the output liquid pressure) $P_{OUT}$ are equal to each other in a deenergized state of the linear solenoid 19, but an input/output characteristic having a hysteresis as shown by O→A→B→C→O in FIG. 4A can be obtained in a condition in which the linear solenoid 19 is energized to bias the valve member 18 by a biasing force fs.

While the input liquid pressure $P_{IN}$ is being increased from a 0 point to an A point, the output liquid pressure $P_{OUT}$ is zero. If the valve member 18 is opened at the A point, the output liquid pressure $P_{OUT}$ is increased with an increase in input liquid pressure $P_{IN}$ in a relationship represented by a following expression:

$P_{OUT}=P_{IN}-fs/a$ wherein a is the sectional area of an input port in the differential pressure regulating valve 11. Even if the input liquid pressure $P_{IN}$ is decreased at a B point, the valve member 18 is maintained at its closed state, so that the output liquid pressure $P_{OUT}$ is not immediately decreased, and the output liquid pressure $P_{OUT}$ is kept constant up to a C point at which it becomes equal to the input liquid pressure $P_{IN}$. If the input liquid pressure $P_{IN}$ starts to drop further at the C point, the one-way valve 15 is opened at the C point and the output and input liquid pressures $P_{OUT}$ and $P_{IN}$ are equalized to each other, whereupon the output liquid pressure $P_{OUT}$ is decreased to the 0 point while keeping a relationship of $P_{OUT}=P_{IN}$. At this time, a hysteresis H during increasing and decreasing of the pressure is determined according to a following expression:

$H=fs/a$

A difference in input liquid pressure $P_{IN}$ between the 0 and A points, i.e., an amount $\Delta P_0$ due to operation of the differential pressure regulating valve is equal to the hysteresis H and can be set at any value by controlling the electric current flowing across the linear solenoid 19.

Therefore, when the regenerative braking of the front wheels Wf is not carried out, the differential pressure regulating valves 11, 11 are deenergized and maintained in their opened states, thereby causing the input liquid pressure $P_{IN}$ to be transferred as the output liquid pressure $P_{OUT}$ to the brake calipers 10f, 10f for the front wheels Wf. As a result, as the depression force on the brake pedal 8 is increased, both the braking force Fr of the brake calipers 10f, 10f for the front wheels Wf and the braking force Rr of the brake calipers 10r, 10r for the rear wheels Wr are increased linearly (see FIG. 5A).

Figure 5A:
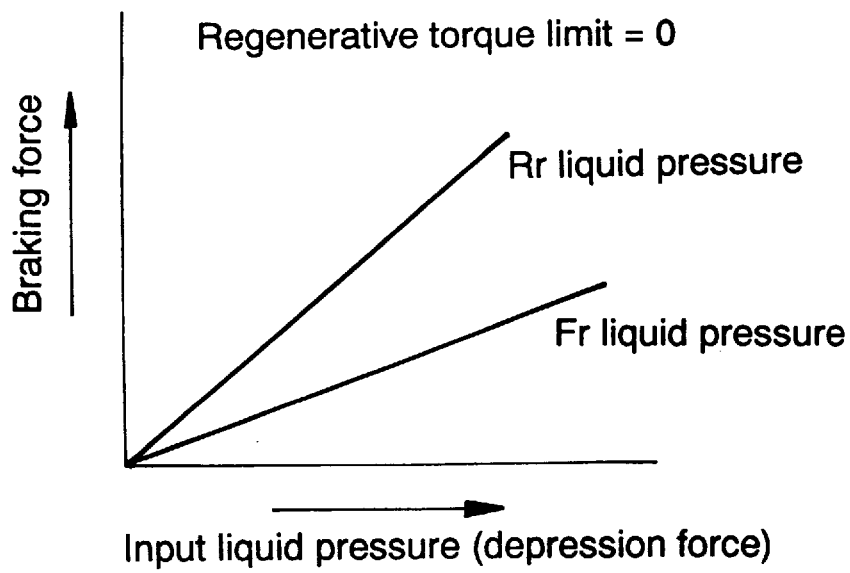
FIGS. 5A and 5B are graphs illustrating a characteristic of distribution of the liquid pressure braking force and the regenerative braking force with respect to the input liquid pressure.
Figure 5B:
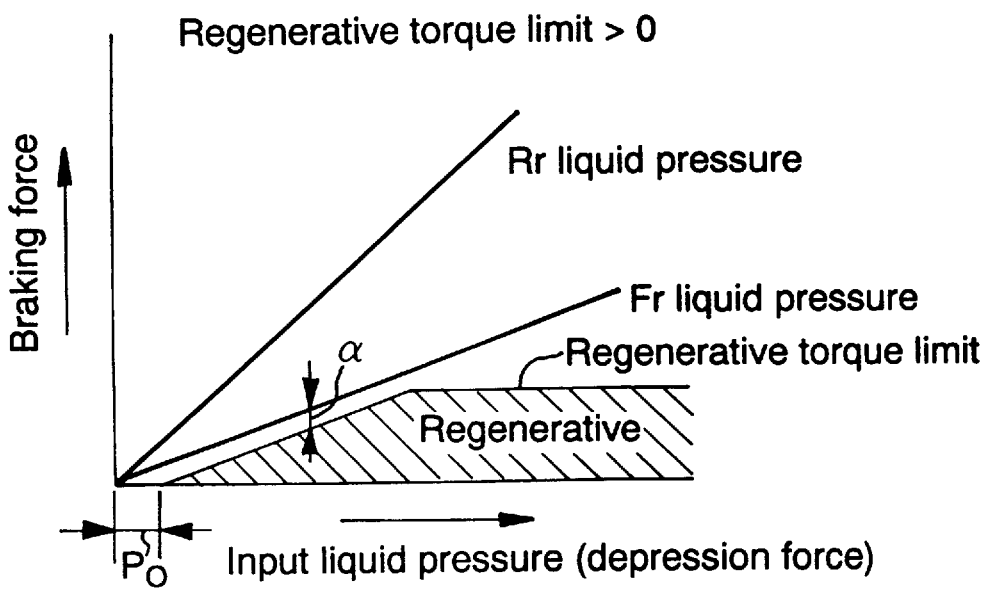

On the other hand, when the regenerative braking of the front wheels Wf is carried out, the differential pressure regulating valves 11, 11 are energized to vary the characteristic of the output liquid pressure $P_{OUT}$ relative to the input liquid pressure $P_{IN}$, thereby partially limiting the braking force Fr of the brake calipers for the front wheels Wf, and the limited braking force is compensated for by the regenerative braking of the front wheels Wf, thereby making it possible to provide a braking force for the front wheels Wf corresponding to the depression force on the brake pedal 8 in total (see FIG. 5B).

Figure 4B:
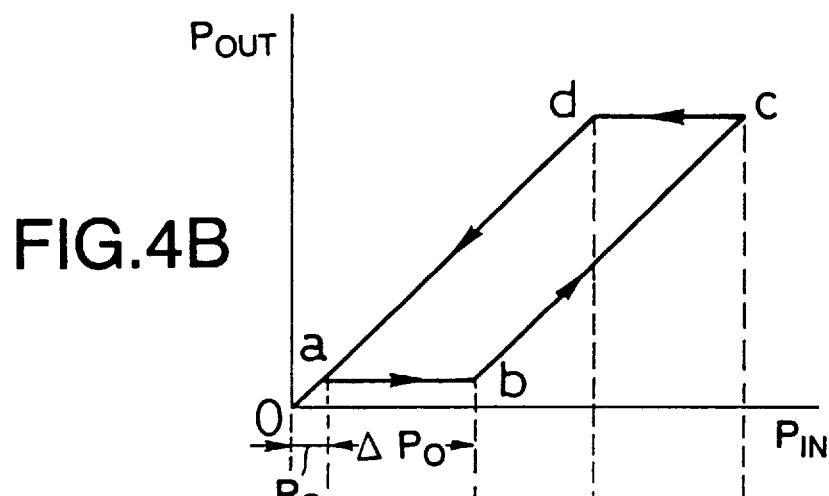

The general description has been made in order to facilitate the understanding of the present invention, but in practice, in the present embodiment, in carrying out the regenerative braking, the differential pressure regulating valves 11, 11 are controlled to vary the characteristic of the output liquid pressure $P_{OUT}$ relative to the input liquid pressure $P_{IN}$ in a manner as shown in FIG. 4B.

More specifically, at an initial stage when the brake pedal 8 has been started to be depressed, the differential pressure regulating valves 11, 11 are not energized and maintained in their opened state until the input liquid pressure $P_{IN}$ reaches a predetermined value $P_0$. From the 0 point to an a point, the input liquid pressure is transferred as the output liquid pressure as it is. When the input liquid pressure has reached the predetermined value $P_0$, an input/output characteristic as shown by 0→a→b→c→d→e is provided by energizing the differential pressure regulating valves 11, 11 as in FIG. 4A. Therefore, at the initial stage when a driver of the vehicle starts depressing the brake pedal 8, the regenerative braking is not carried out, and the input liquid pressure $P_{IN}$ is transferred as the output liquid pressure as it is, to the brake calipers 10f, 10f for the front wheels Wf to effect a liquid pressure braking. After the input liquid pressure $P_{IN}$ has reached to the predetermined value $P_0$, the output liquid pressure $P_{OUT}$ is cut off by the differential pressure regulating valves 11, 11 to limit the liquid pressure braking force Fr for the front wheels Wf, and the decrement is compensated for by the regenerative braking of the front wheels Wf.

Figure 4C:
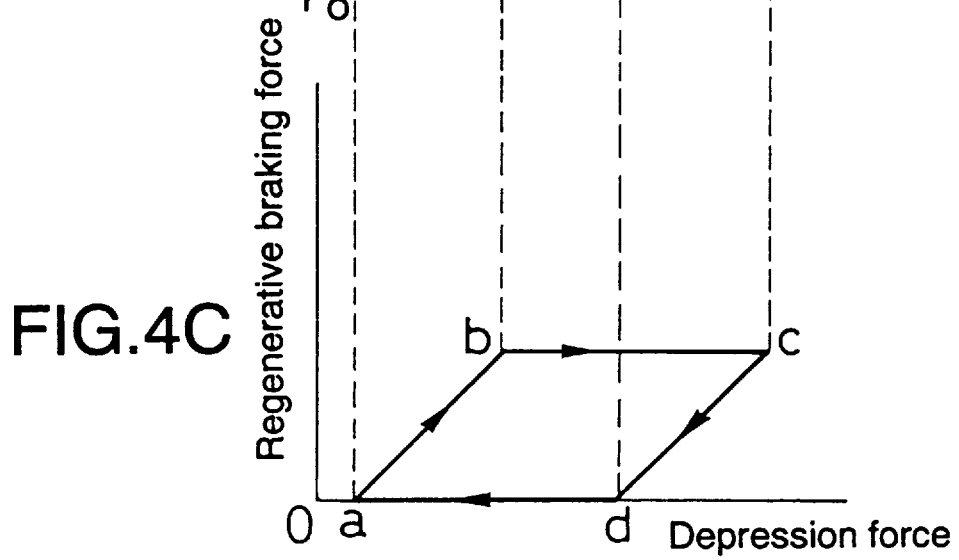

As described above, when both the liquid pressure braking force and the regenerative braking force are used, the ratio of the liquid pressure braking force to the regenerative braking force is varied in the course in which the depression force on the brake pedal 8 is increased or decreased. Therefore, in order to ensure that the sum total of both the braking forces is not suddenly varied, it is necessary to control the magnitude of the regenerative braking force as shown in FIG. 4C.

That is, in a range from the 0 point to the a point in which the output liquid pressure $P_{OUT}$ (i.e., the liquid pressure braking force) is increased with respect to the input liquid pressure $P_{IN}$ (i.e., the depression force), the regenerative braking force is maintained at zero. In a range of from the a point to the b point in which even if the input liquid pressure $P_{IN}$ is increased, the output liquid pressure $P_{OUT}$ is not increased, but rather the regenerative braking force is increased with an increase in the depression force. In a range of from b point to c point in which the output liquid pressure $P_{OUT}$ is increased with an increase in the input liquid pressure $P_{IN}$, the increasing of the regenerative braking force is suppressed. In a range of from the c point to the d point in which even if the input liquid pressure $P_{IN}$ is decreased, the output liquid pressure $P_{OUT}$ is not decreased, the regenerative braking force is decreased with a decrease in the depression force. In a range of from the d point to 0 point in which the output liquid pressure $P_{OUT}$ is decreased with a decrease in the input liquid pressure $P_{IN}$, it is necessary to maintain the regenerative braking force at zero.

Thus, a characteristic of distribution of the liquid pressure braking force Fr and the regenerative braking force in the front wheels Wf is as shown in FIG. 5B, and the regenerative braking can be preferentially performed to effectively recover energy. After the regenerative braking force has reached a limit, the liquid pressure braking force Fr can be added to insure a required total braking force.

The variation in stroke of the brake pedal upon depression of the brake pedal 8 now will be described below.

In general, when the brake calipers are operated by a liquid pressure generated by the master cylinder by depression of the brake pedal, the amount of liquid consumed at an initial stage of braking is increased due to the play in each of the brake calipers. As the play is eliminated, thereby causing the braking force to be increased, the increase in the amount of liquid consumed is reduced.

Figure 6:
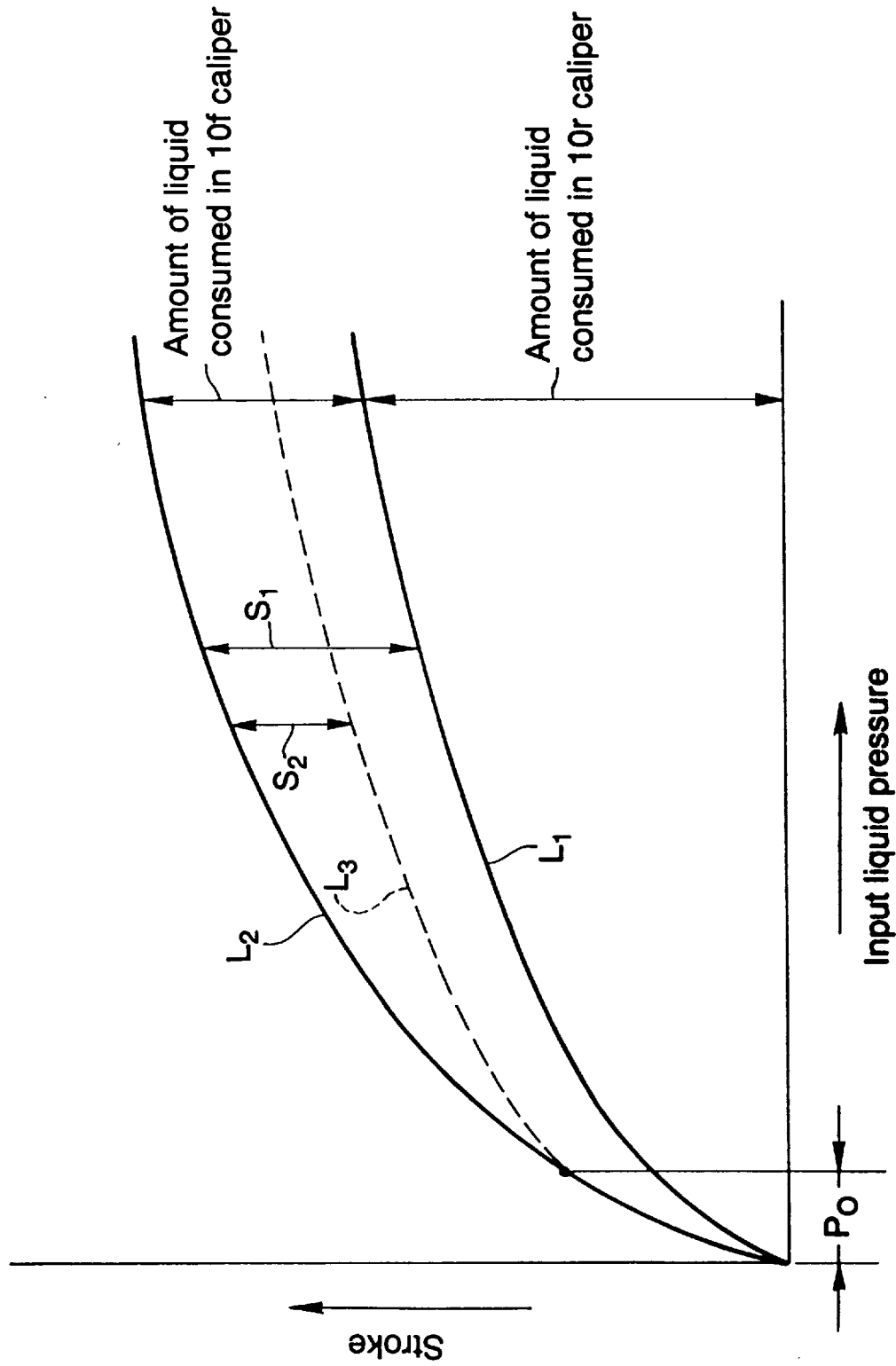
FIG. 6 is a graph illustrating a stroke characteristic of a brake pedal with respect to the input liquid pressure.

Therefore, the amount of stroke of the brake pedal 8 required due to such liquid consumed in the brake calipers 10r, 10r for the rear wheels Wr is increased at the initial stage of braking as shown by a line $L_1$ in FIG. 6 with an increase in the input liquid pressure $P_{IN}$. At this time, when the differential pressure regulating valves 11, 11 have been energized to close the liquid pressure circuit, the amount of liquid consumed in the brake calipers 10r, 10r for the front wheels Wf is zero and hence, the stroke of the brake pedal 8 is varied along the line $L_1$. On the other hand, when the differential pressure regulating valves 11, 11 have been deenergized to open the liquid pressure circuit, the amount of liquid consumed in the brake calipers 10r, 10r for the front wheels Wf is largest and hence, the stroke of the brake pedal 8 is varied along a line $L_2$.

On the other hand, until the input liquid pressure $P_{IN}$ is gradually increased from zero to reach the predetermined value $P_0$, the differential pressure regulating valves 11, 11 are maintained in their deenergized states to open the liquid pressure circuit, and if the differential pressure regulating valves 11, 11 are energized to close the liquid pressure circuit when the input liquid pressure $P_{IN}$ has reached the predetermined value $P_0$, the stroke of the brake pedal 8 is varied along a line $L_3$.

Therefore, when the differential pressure regulating valves 11, 11 are changed from their energized states to their deenergized states to open the liquid pressure circuit in order to switch over the regenerative braking to the liquid pressure braking, a large change in the stroke shown by $S_1$ in FIG. 6 is produced to make the braking feeling uncomfortable, if the characteristic of the differential pressure regulating valves 11, 11 is controlled as shown in FIG. 4A. Therefore, if the characteristic of the differential pressure regulating valves 11, 11 is controlled as shown in FIG. 4B as in the present embodiment, only a small change in the stroke shown by $S_2$ in FIG. 6 is produced, which makes it possible to improve the braking feeling.

As described above, at the initial stage of braking in which the amount of liquid consumed in the brake calipers 10f, 10f is larger, the liquid pressure is temporarily carried out, and the stroke due to the play of the brake calipers 10f, 10f is absorbed, thereby making it possible to minimize the change in the stroke of the brake pedal 8, when the regenerative braking is switched over to the liquid pressure braking.

The start of the regenerative braking is delayed by temporarily using the liquid pressure braking at the initial stage of braking, so that the regenerative braking force is decreased by an amount shown by α in FIG. 5B, resulting in a reduced rate of recovery of the energy. But such a decrement is extremely small and hence, is substantially unimportant.

The above-described operation will be further described with reference to flow charts and graphs.

Figure 7:
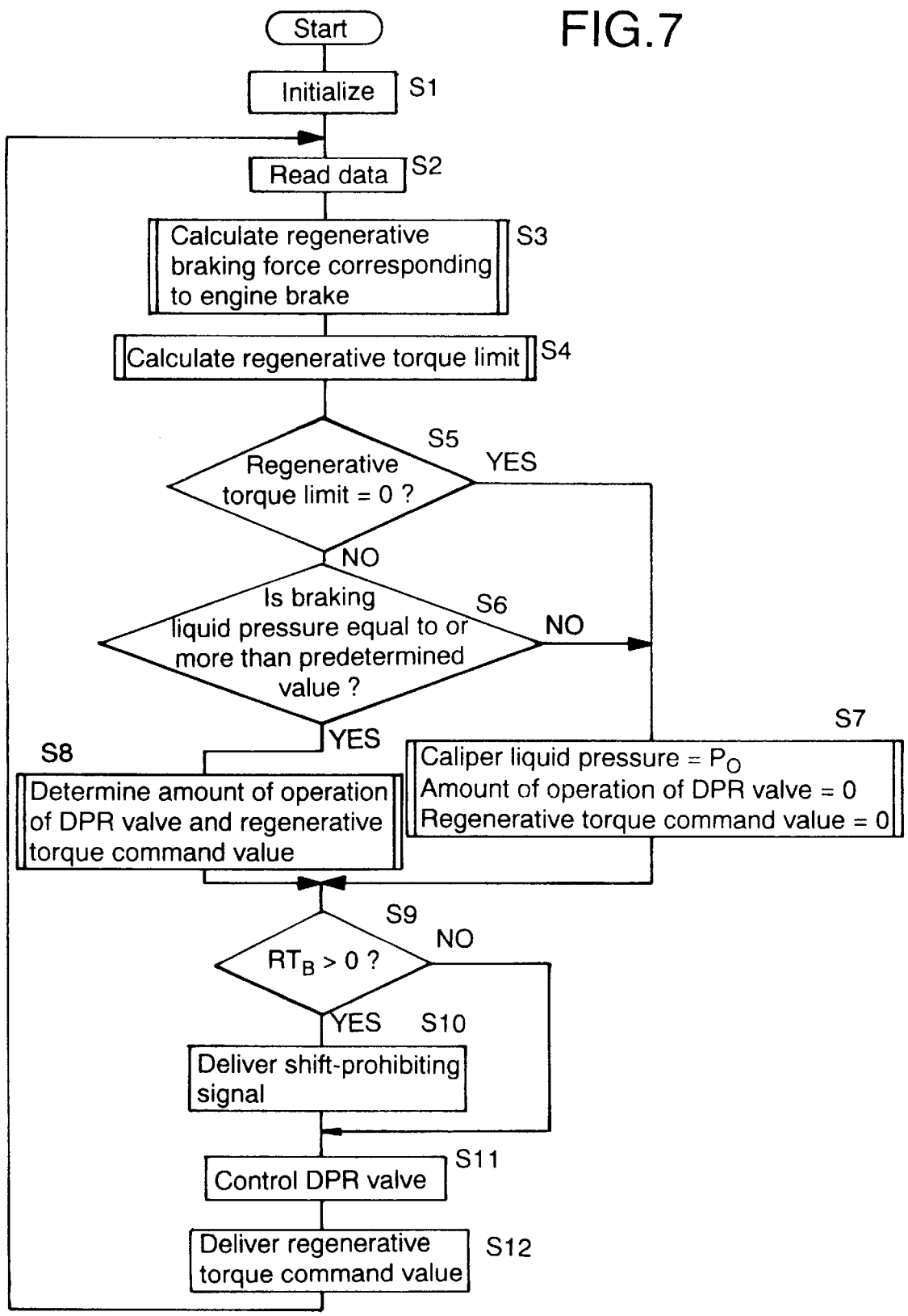
FIG. 7 is a flow chart of a main routine.

First, at step S1 in the flow chart of a main routine shown in FIG. 7, the motor/AT control unit 6 and the brake control unit 7 are initialized in their operable states. At this time, an initial value of the output liquid pressure $P_{OUT}$ is set at the predetermined value $P_0$ shown in FIG. 4B. Then, at step S2, the master cylinder liquid pressure $P_{IN}$ from the master cylinder liquid pressure sensor 12, the accelerator opening degree TH from the accelerator opening degree sensor 13, the number $N_M$ of revolutions of the motor from the motor revolution-number sensor 14 and the battery voltage $V_{BATT}$ from the battery voltage sensor 15 are read in the brake control unit 7 (see FIG. 2).

Figure 8:
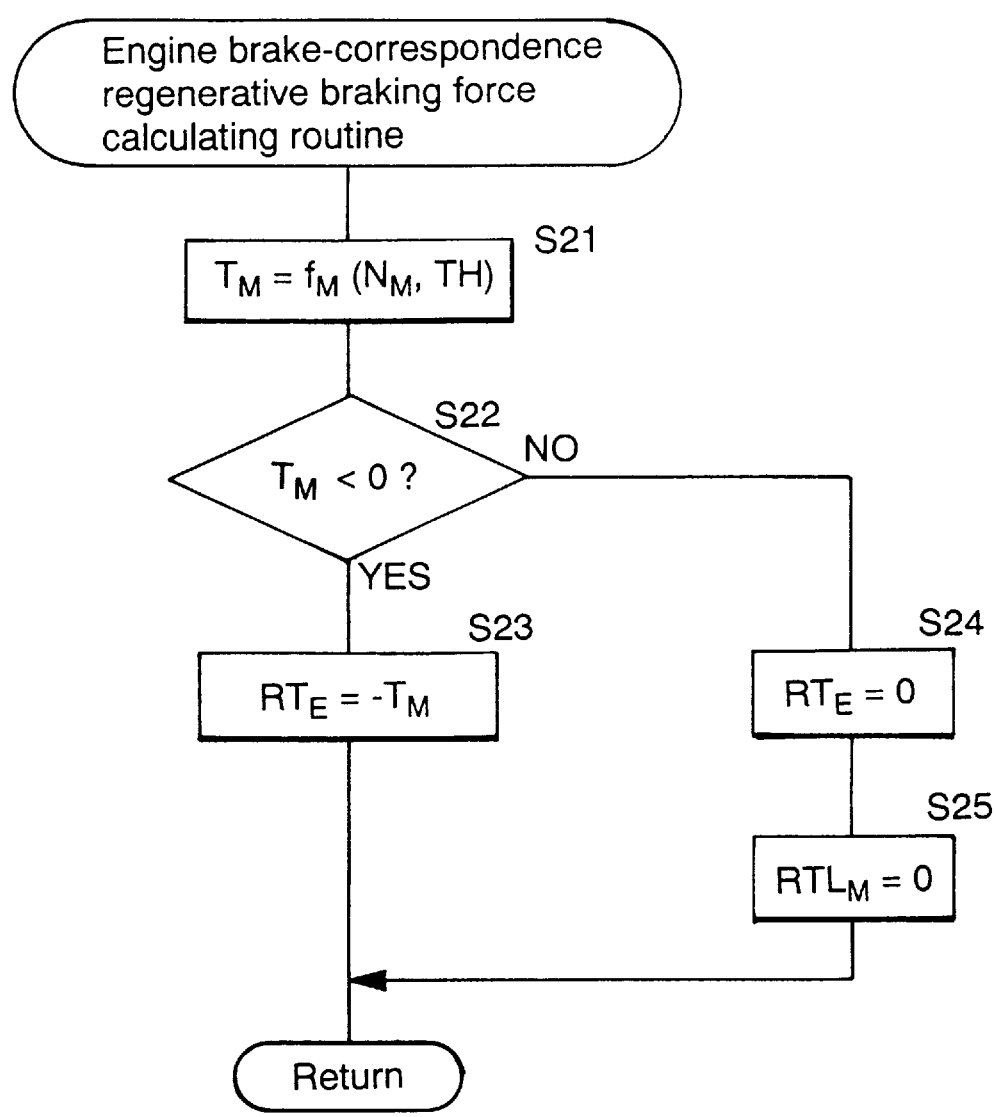
FIG. 8 is a flow chart of a subroutine of step S3 in the main routine.

At step S3, the calculation of a force $RT_E$ of a regenerative braking corresponding to an engine brake of a vehicle using an internal combustion engine as a drive source is carried out by an engine brake-correspondence regenerative braking force calculating routine (see FIG. 8).

Figure 10:
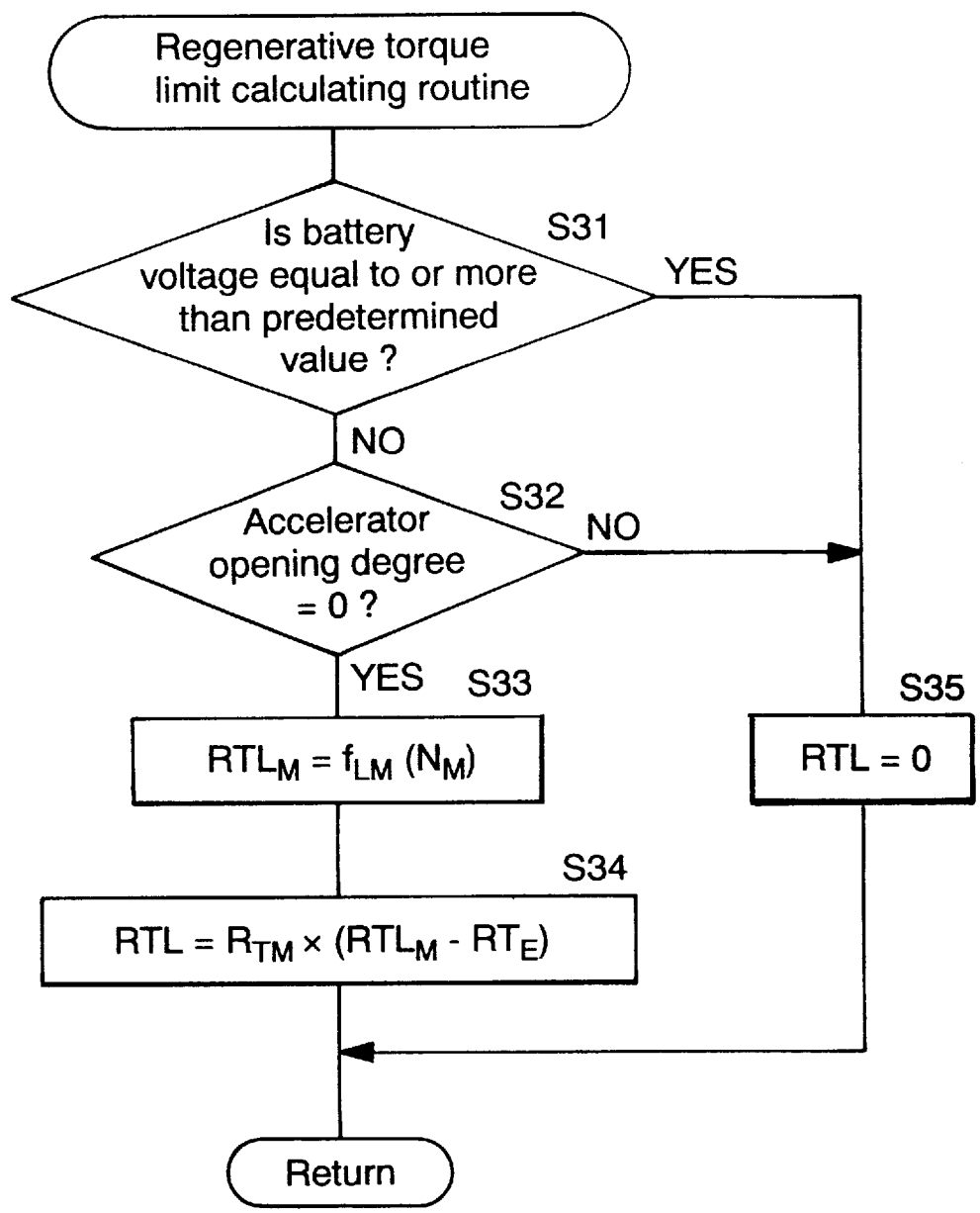
FIG. 10 is a flow chart of a subroutine of step S4 in the main routine.

At step S4, a torque RTL which is usable during a braking operation and which is a limit value of regenerative braking force exhibitable at every moment, is calculated by a regenerative torque limit calculating routine (see FIG. 10).

If the value of regenerative torque limit (the torque RTL usable during the braking operation) is determined to be zero at step S5 then the regenerative braking cannot be conducted, or if the braking liquid pressure does not reach the predetermined value $P_0$ at step S6 (i.e., in a range of the 0 point to the a point in FIG. 4B corresponding to immediately after the start of depression of the brake pedal 8) even if the regenerative torque limit value is not zero at step S5, the caliper liquid pressure ($P_{OUT}$) is set at the predetermined value $P_0$; the amount ($\Delta P_0$) of operation of the differential pressure regulating valve (DPR valve) 11 is set at zero and the regenerative torque command value (RT) is set at zero at step S7 in order to prohibit regenerative braking and to carry out liquid pressure braking.

On the other hand, if the regenerative torque limit value is not zero at step S5 and the braking liquid pressure reaches the predetermined value $P_0$ at step S6, an amount of operation of the differential pressure regulating valve for determining a liquid pressure braking force for the front wheels Wf is determined and a regenerative torque command value for determining a regenerative braking force for the front wheels Wf is determined at step S8.

At step S9, a value of a regenerative torque $RT_B$ (which will be described hereinafter) corresponding to a brake operation amount calculated at step S8 is compared with zero. If $RT_B > 0$, a shift prohibiting signal is delivered from the brake control unit 7 to the motor-AT control unit 6 at step S10, thereby prohibiting gear-shifting of the automatic transmission 3.

When the value of the regenerative torque $RT_B$ corresponding to the brake operation amount is zero and the regenerative braking of the front wheels Wf is not to be carried out, the gear-shifting of the transmission 3 is not prohibited. In other words, when the gear-shifting of the transmission 3 is carried out, the regenerative braking of the front wheels Wf is not carried out. Therefore, it is unnecessary to discontinue the regenerative braking during gear-shifting. This prevents a reduction in braking force during gear-shifting, but also prevents the generation of a shock.

Then, the liquid pressure braking of the front wheels Wf is performed by a predetermined braking force by controlling the differential pressure regulating valves 11, 11 at step S11, and the regenerative braking of the front wheels Wf is performed by the delivery of the regeneration command value at step S12.

Figure 9:
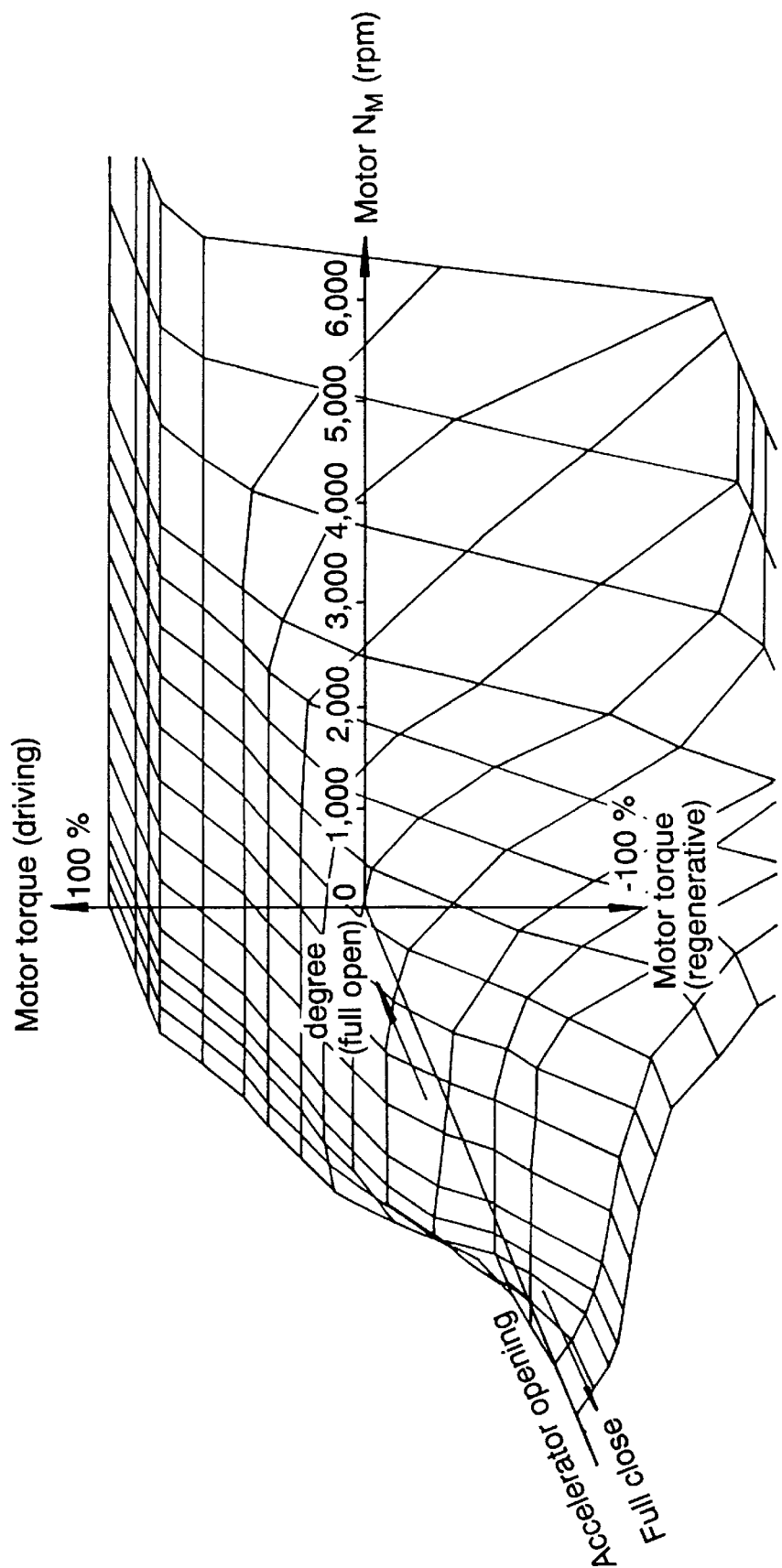
FIG. 9 is a map for determining a motor torque.

The specific contents of the engine brake-correspondence regenerative braking force calculating routine will be described with reference to the subroutine of the flow chart of FIG. 8 and the map shown in FIG. 9.

First, at step S21, a motor torque $T_M$ is determined based on the motor revolution number $N_M$ and the accelerator opening degree TH. FIG. 9 illustrates the map for determining the motor torque $T_M$. When the motor revolution number $N_M$ and the accelerator opening degree TH have been determined, a motor torque $T_M$ corresponding to them is provided as a function $f_M(N_N, TH)$. The value of the motor torque $T_M$ becomes a driving torque when it is located above the origin of the axis of ordinates, whereas the value of the motor torque $T_M$ becomes a regenerative torque when it is located below the origin of the axis of ordinates in FIG. 9.

Then, at step S22, it is judged whether the motor torque $T_M$ determined at step S21 is plus or minus. If the motor torque $T_M$ is minus and the regenerative braking is to be carried out, the engine brake-correspondence regenerative braking force $RT_E$ is set at $-T_M$ at step S23. On the other hand, if the motor torque $T_M$ is not minus at step S22 and a usual driving is being carried out, the engine brake-correspondence regenerative braking force $RT_E$ is set at zero at step S24, and the motor-generatable torque $RTL_M$ corresponding to an axle torque is set at zero at step S25.

The specific contents of the regenerative torque limit calculating routine at the step S4 in the flow chart shown in FIG. 7 will be described with reference to a flow chart shown in FIG. 10 and a map shown in FIG. 11.

First, it is judged at step S31 whether the battery voltage $V_{BATT}$ detected by the battery voltage sensor 15 is equal to or more than a predetermined value. If the battery voltage $V_{BATT}$ is equal to or more than the predetermined value, it is not required to carry out the regenerative braking and hence, the torque RTL usable during the braking operation is set at zero at step S35.

If the battery voltage $V_{BATT}$ is determined in step S31 to be less than the predetermined amount, then it is judged at step S32 whether or not the accelerator opening degree TH detected by the accelerator opening degree sensor 13 is zero. If the accelerator opening degree TH is not zero, i.e., if the motor 2 is being driven, the regenerative braking is not carried out and hence, the torque usable during the braking operation is set at zero at step S35.

Figure 11:
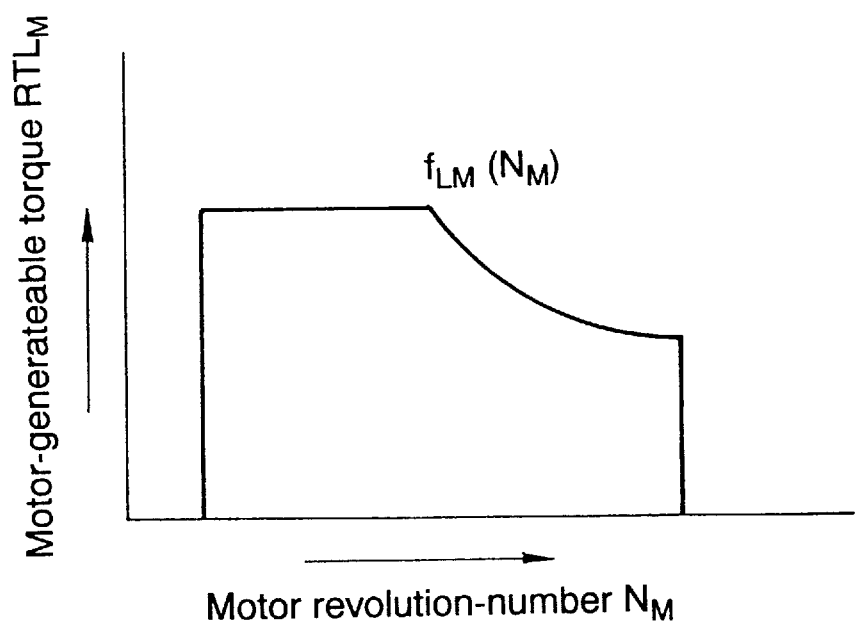
FIG. 11 is a map for determining a motor-generatable torque.

If the battery voltage $V_{BATT}$ is lower than the predetermined value at step S31 and the accelerator opening degree TH is zero at step S32, a motor-generatable torque $RTL_M$ generatable by the motor 2 is determined from the map shown in FIG. 11 based on the motor revolution number $N_M$ detected by the motor revolution-number sensor 14.

Then, a torque RTL usable during the braking operation is calculated at step S34 by multiplying the difference between the motor-generatable torque $RTL_M$ and the engine brake-correspondence regenerative braking force $RT_E$ by a gear ratio $R_{TM}$.

Figure 12:
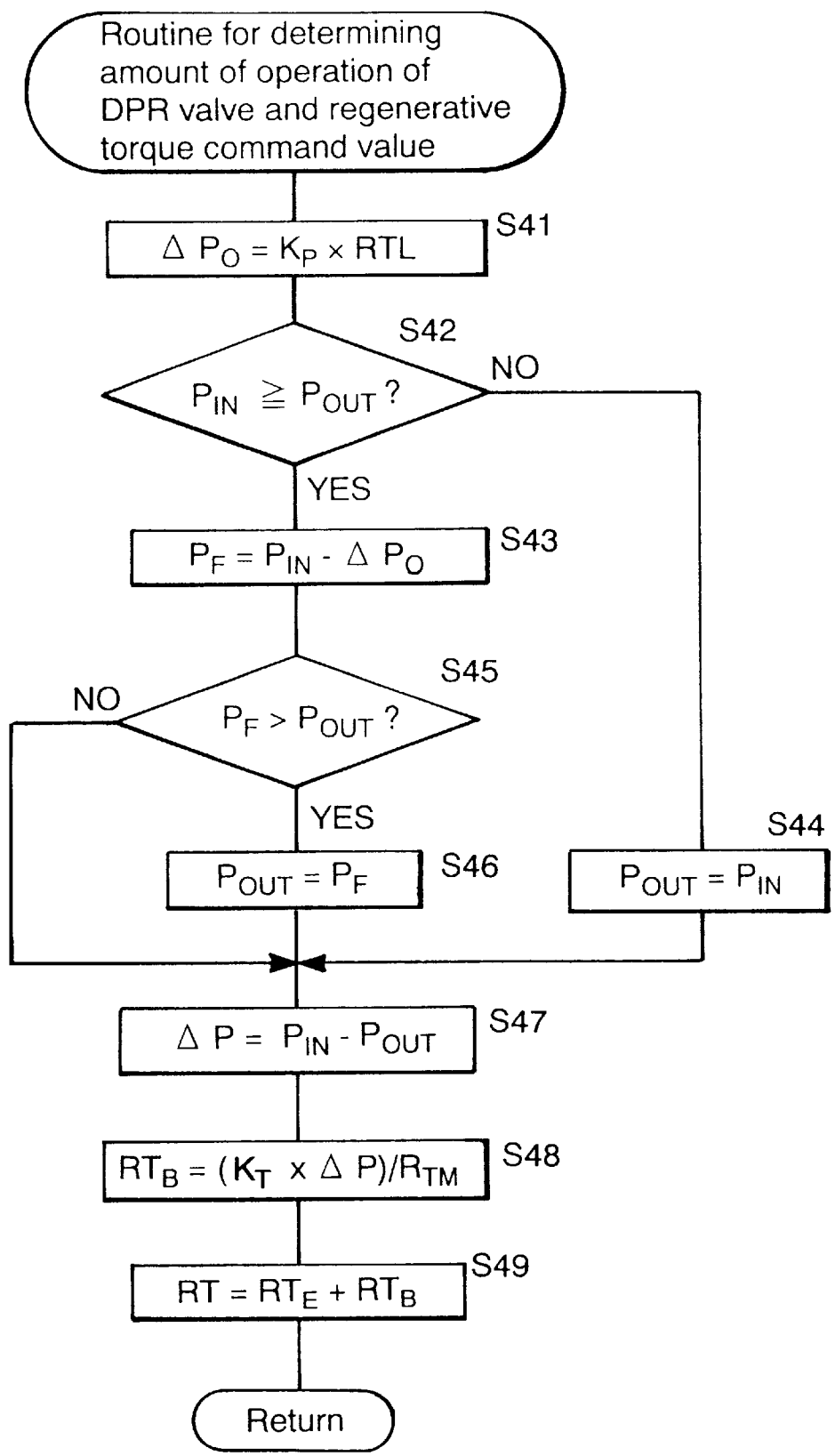
FIG. 12 is a flow chart of a subroutine of step S8 in the main routine.

The specific contents of a routine for determining the amount of operation of the differential pressure regulating valve and a regenerative torque will be described below with reference to a flow chart shown in FIG. 12.

First, at step S41, an amount $\Delta P_0$ of operation of the differential pressure regulating valve is calculated by multiplying the torque RTL usable during the braking operation, which has been determined in the regenerative torque limit calculating routine shown in FIG. 10, by a torque-liquid pressure converting constant $K_P$.

Then, because the output liquid pressure $P_{OUT}$ has been previously initialized at the predetermined value $P_0$ ($P_{OUT} = P_0$) at step S1, the input liquid pressure $P_{IN}$ is determined to be equal to or more than $P_{OUT}$ at step S42 when it has exceeded the predetermined value $P_0$ as a result of depression of the brake pedal 8, thereby proceeding to step S43. At step S43, $P_F$ is calculated according to an expression of $P_F = P_{IN} - \Delta P_0$, and at step S45, $P_F$ is compared with $P_{OUT}$. In the range of from the a point to the b point shown in FIG. 4B, the value of $P_F$ is equal to or less than $P_{OUT}$ and hence, the answer at step S45 is NO, proceeding to step S47.

At step S47, a differential pressure $\Delta P$ is calculated according to an expression of $P_{IN} - P_{OUT}$. At this time, $P_{OUT} = P_0$ in the range of from the a point to the b point and therefore, the differential pressure $\Delta P$ is equal to $P_{IN} - P_{OUT}$.

If the brake pedal 8 is further depressed to enter the range of from the b point to the c point, $P_F > P_{OUT}$ and hence, the answer at step S45 is YES, proceeding to step S46, at which $P_{OUT}$ is substituted with $P_F$ calculated at step S43. Thus, the differential pressure $\Delta P$ is equal to $\Delta P_0$ (a constant value) at step S47.

If the range from the c point to the d point in which the depression force on the brake pedal 8, i.e., $P_{IN}$ is reduced has been entered, the answer at step S45 becomes NO, proceeding to step S47. At that time, the differential pressure P$\Delta$ is reduced to zero in the range from the c point to the d point.

If the depressing force of the brake pedal 8 is further decreased and the range from the d point to the 0 point has been entered, the answer at step S42 becomes NO, proceeding to step S44, at which the value of $P_{OUT}$ is substituted with $P_{IN}$. This causes the differential pressure $\Delta P$ to become zero at step S47.

When the differential pressure $\Delta P$ between the input and output liquid pressures $P_{IN}$ and $P_{OUT}$ has been determined in the above manner, a regenerative torque $RT_B$ corresponding to the brake operation amount is determined at step S48 from the differential pressure $\Delta P$, the liquid pressure-torque converting constant $K_T$ and the gear ratio $R_{TM}$. A regenerative torque command value RT is determined at step S49 by adding the engine brake-correspondence regenerative braking force $RT_E$ to the regenerative torque $RT_B$ corresponding to the brake operation amount.

Thus, the liquid pressure braking force is controlled by operating the differential pressure regulating valves 11, 11 based on the amount of operation of the differential pressure regulating valves determined at step S41. The regenerative braking force is controlled based on the regenerative torque command value RT determined at step S49.

Although the embodiment of the present invention has been described in detail, it will understood that the present invention is not limited to the above-described embodiment, and various modifications in design may be made without departing from the spirit and scope of the invention defined in claims.

For example, although the vehicle including the front wheels W$f$ as the driven wheels and the rear wheels W$r$ as the follower wheels has been exemplified in the embodiment, the present invention is also applicable to a vehicle including front wheels W$f$ as follower wheels and rear wheels as driven wheels. In addition, in place of the indirect detection of the amount of operation of the brake pedal 8 by the master cylinder liquid pressure sensor 12, the amount of operation of the brake pedal 8 may be directly detected by a stroke sensor or the like.

What is claimed is:

1. A brake system in an electric vehicle including driven wheels which are connected to and driven by an electric motor using a battery as an energy source and which driven wheels are capable of being liquid-pressure braked and regeneratively braked, comprising:
    a liquid pressure braking means for liquid pressure braking said driven wheels in response to the operation of a brake pedal connected to a master cylinder for supplying a liquid pressure;
    a regenerative braking means for regenerative braking said driven wheels in response to the operation of said brake pedal;
    a pressure sensor for sensing the liquid pressure supplied by said master cylinder;
    a liquid pressure control means for controlling the braking liquid pressure transferred from the master cylinder to the liquid pressure braking means during a regenerative braking; and
    a braking control means for controlling both said liquid pressure control means and said regenerative braking means based on the master cylinder liquid pressure sensed by said pressure sensor, as follows:
        (a) to cause said liquid pressure control means to supply to said liquid pressure braking means the full master cylinder liquid pressure and to cause said regenerative braking means to produce no regenerative braking when said sensed pressure is less than a predetermined value,
        (b) to cause said liquid pressure control means to supply to said liquid pressure braking means a predetermined magnitude of liquid pressure and to cause said regenerative braking means to produce a regenerative braking force progressively increasing from zero to a maximum amount when and as said sensed pressure increases from said predetermined value to an intermediate value, and
        (c) to cause said liquid pressure control means to supply to said liquid pressure braking means with a progressively increasing liquid pressure above said predetermined magnitude as said sensed pressure progressively increases beyond said intermediate value and to cause said regenerative braking means to produce a constant regenerative braking force of said maximum amount when said sensed pressure exceeds said intermediate value;
    said braking control means also controlling both said liquid pressure control means and said regenerative braking means for causing a sum of said braking liquid pressure braking force generated by said liquid pressure braking means and said regenerative braking force generated by said regenerative braking means to be varied at a predetermined fixed rate in response to a change in the amount of the operation of said brake pedal.

2. A brake system of claim 1, wherein said liquid pressure control means comprises:
    a differential pressure regulating valve positioned in a conduit connecting said master cylinder and said liquid pressure braking means for each of said driven wheels for controlling the braking liquid pressure supplied to said liquid pressure braking means from said master cylinder based on the liquid pressure sensed by said pressure sensor, said differential pressure regulating valve having a linear solenoid for controlling the amount of opening through said differential pressure regulating valve and a check valve for allowing reverse liquid flow passed said differential pressure valve; and
    wherein said braking control means operates said linear solenoid in response to the master cylinder pressure sensed by said pressure sensor to cause said differential pressure regulating valve to supply to the liquid pressure braking means said predetermined magnitude of liquid pressure that is less than the master cylinder liquid pressure when said sensed pressure exceeds said predetermined value.

3. The braking system of claim 2 wherein said liquid pressure braking means also provides liquid pressure for braking force to non-driven wheels of the electric vehicle, said differential pressure regulating valve providing control of only said braking liquid pressure supplied to said driven wheels.

4. The brake system of claim 1, wherein said liquid pressure control means includes a differential pressure regulating valve positioned in a conduit connecting said master cylinder and said liquid pressure braking means for each of said driven wheels for controlling the liquid pressure supplied to said liquid pressure braking means from said master cylinder based on the liquid pressure sensed by said pressure sensor, said differential pressure regulating valve having a linear solenoid for controlling the amount of opening through said differential pressure regulating valve and a check valve for allowing reverse liquid flow passed said differential pressure valve.

* * * * *